United States Patent
Vishwakarma Chandrachary et al.

(10) Patent No.: US 12,466,420 B2
(45) Date of Patent: Nov. 11, 2025

(54) TARGET DOWNSELECTION

(71) Applicant: Ford Global Technologies, LLC, Dearborn, MI (US)

(72) Inventors: Shiva Chaitanya Vishwakarma Chandrachary, Toronto (CA); Martin Miller, Sunnyside, NY (US)

(73) Assignee: Ford Global Technologies, LLC, Dearborn, MI (US)

( * ) Notice: Subject to any disclaimer, the term of this patent is extended or adjusted under 35 U.S.C. 154(b) by 168 days.

(21) Appl. No.: 18/344,090

(22) Filed: Jun. 29, 2023

(65) Prior Publication Data

US 2025/0002030 A1      Jan. 2, 2025

(51) Int. Cl.
*B60W 50/08* (2020.01)
*B60W 40/02* (2006.01)
*B60W 50/00* (2006.01)

(52) U.S. Cl.
CPC .......... *B60W 50/085* (2013.01); *B60W 40/02* (2013.01); *B60W 2050/0052* (2013.01); *B60W 2050/0075* (2013.01)

(58) Field of Classification Search
CPC .............. B60W 50/085; B60W 40/02; B60W 2050/0052; B60W 2050/0075
See application file for complete search history.

(56) References Cited

U.S. PATENT DOCUMENTS

| | | |
|---|---|---|
| 11,577,753 B2 | 2/2023 | Heyl et al. |
| 11,912,301 B1* | 2/2024 | Hendy ............ B60W 60/00276 |
| 12,197,963 B2* | 1/2025 | Ichimaru ............... B60R 16/023 |
| 2003/0168271 A1* | 9/2003 | Massen ................ G06V 10/255 180/167 |
| 2012/0116663 A1* | 5/2012 | Tsunekawa ............... B60T 7/22 701/300 |
| 2014/0249722 A1* | 9/2014 | Hegemann ............. G08G 1/167 701/1 |
| 2015/0298692 A1* | 10/2015 | Minemura ............ B60W 30/09 701/1 |
| 2016/0078763 A1* | 3/2016 | Kiyokawa ............ G06V 20/588 382/104 |

(Continued)

FOREIGN PATENT DOCUMENTS

| | | |
|---|---|---|
| CN | 112706785 A | 4/2021 |
| JP | 2021147030 A | 9/2021 |

OTHER PUBLICATIONS

Yao et al., "Target Vehicle Selection Algorithm for Adaptive Cruise Control Based on Lane-changing Intention of Preceding Vehicle", Chinese Journal of Mechanical Engineering (2021) 34:135, https://doi.org/10.1186/s10033-021-00650-8.

*Primary Examiner* — Sze-Hon Kong
(74) *Attorney, Agent, or Firm* — Frank A. Mackenzie; Brooks Kushman P.C.

(57) ABSTRACT

Respective driver assist features that are currently active in a vehicle are identified, and parameters are obtained for determining respective sets of target objects for the driver assist features. The parameters of a first one of the driver assist features are applied to output a first target set of one or more targets selected from a set of candidate objects for the first one of the driver assist features, and then parameters of a second one of the driver assist feature are applied to output a second target set of one or more targets selected from the set of candidate objects for the second one of the driver assist features.

20 Claims, 5 Drawing Sheets

(56) References Cited

U.S. PATENT DOCUMENTS

| | | | |
|---|---|---|---|
| 2017/0036674 A1* | 2/2017 | Izuhara | B60W 30/0956 |
| 2018/0362011 A1* | 12/2018 | Picron | G01S 17/931 |
| 2019/0113919 A1 | 4/2019 | Englard et al. | |
| 2020/0247396 A1* | 8/2020 | Kim | G06V 20/586 |
| 2021/0191394 A1* | 6/2021 | Dudley | G05D 1/0061 |
| 2022/0404488 A1* | 12/2022 | Das | G01S 13/66 |
| 2023/0120933 A1* | 4/2023 | Kim | B60K 35/60 |
| | | | 345/633 |
| 2023/0137313 A1* | 5/2023 | Schoenherr | B60W 50/16 |
| | | | 701/93 |
| 2023/0192101 A1* | 6/2023 | Delahais | B60W 50/14 |
| | | | 701/26 |
| 2023/0286538 A1* | 9/2023 | Peng | B60W 60/0018 |
| 2023/0294727 A1* | 9/2023 | Oh | B60W 40/02 |
| | | | 701/23 |
| 2023/0322259 A1* | 10/2023 | Sadek | G01C 21/32 |
| | | | 701/23 |
| 2023/0339496 A1* | 10/2023 | Yamashita | G06Q 10/047 |
| 2023/0382389 A1* | 11/2023 | Mochizuki | B60W 40/02 |
| 2023/0401443 A1* | 12/2023 | Komorkiewicz | G06V 10/95 |
| 2023/0406294 A1* | 12/2023 | Lee | B60W 30/0956 |
| 2024/0025432 A1* | 1/2024 | Sadakuni | G06V 20/59 |
| 2024/0201377 A1* | 6/2024 | Nestinger | G01S 17/89 |
| 2024/0246489 A1* | 7/2024 | Dan | G06V 20/58 |
| 2024/0278801 A1* | 8/2024 | Lee | B62D 15/0285 |
| 2024/0321093 A1* | 9/2024 | Oyama | G08G 1/096783 |
| 2024/0420569 A1* | 12/2024 | Stark | G08G 1/09626 |
| 2024/0425074 A1* | 12/2024 | Shahriari | B60W 40/02 |

* cited by examiner

TARGET DOWNSELECTION

BACKGROUND

A vehicle may include driver assistance features such as advanced driver assistance systems (ADAS) or driver assist technology (DAT). Examples of driver assistance features are backup assist, parking assist, blind spot assist, emergency front braking assist, rear cross traffic assist, lane change assist, lane keeping assist, intersection assist, cruise control, virtual bumper, and the like. These features may monitor or track a position of various objects around the vehicle, which may be referred to as "targets," and may narrow a field of choices from among a plurality of targets under consideration to the ones to be tracked for the driver assistance system. This narrowing of the field of choices among the targets detected is referred to as "downselection."

DETAILED DESCRIPTION

Figure 1:
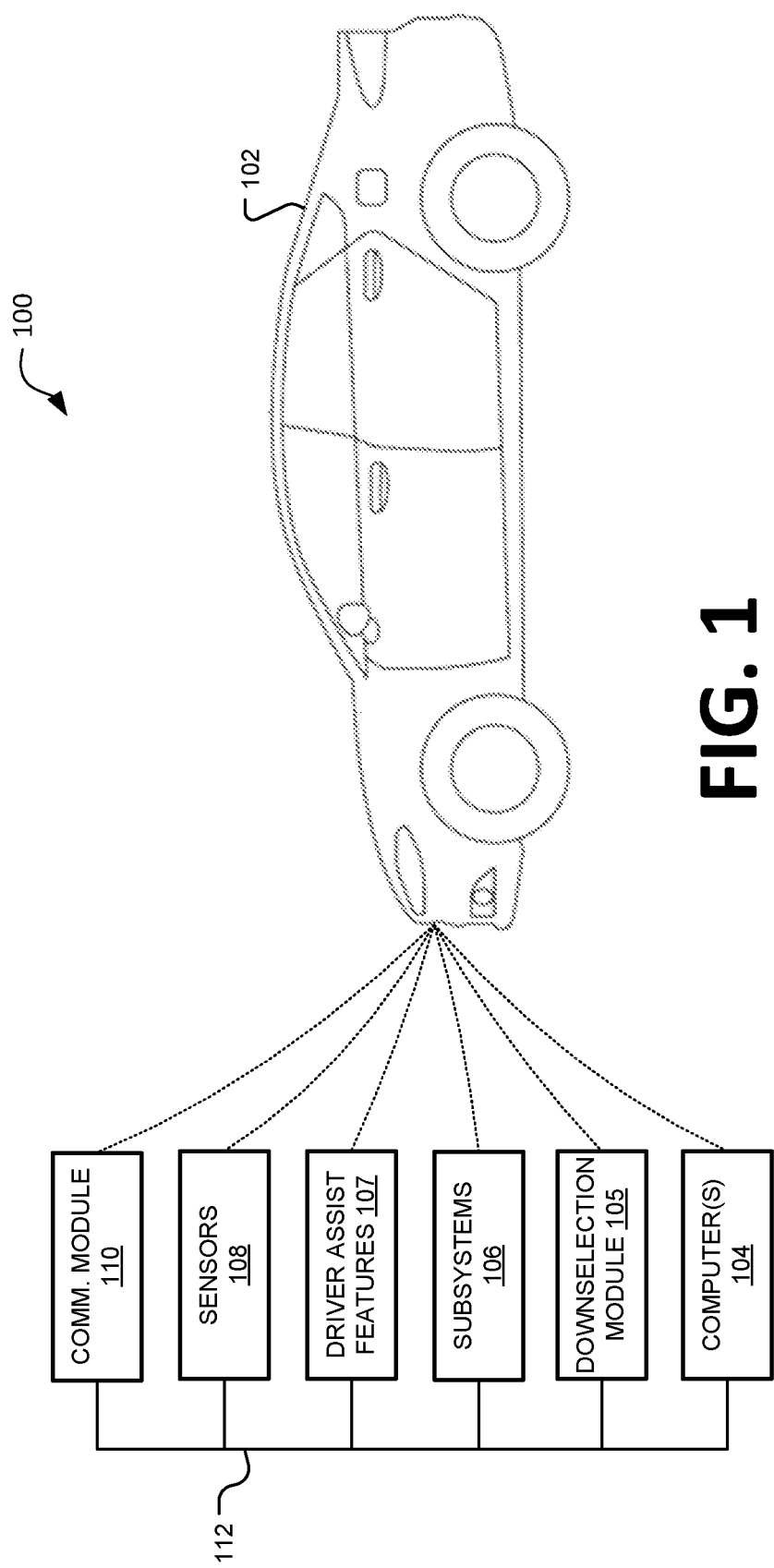
FIG. 1 is diagram of an example system for providing generalized target downselection for a vehicle.

A vehicle may include numerous devices for performing operations of various driver assistance systems or features. Driver assistance features typically rely on sensing and tracking objects around a vehicle. Programming and computing resources thus may be dedicated to performing downselection processes for respective driver assistance features according to specific criteria for target selection for a respective driver assistance feature. As described herein, downselection for respective multiple driver assistance features may be performed collectively, e.g., via a single process and/or module, thereby conserving processing and/or other computing resources of the vehicle and providing a common framework for efficiently modifying or adding new driver assistance features. In examples, a computer in a vehicle may receive input data including data from sensors (e.g., cameras, RADAR, LiDAR, ultrasonic, etc.) and/or from another computer that has processed such data. Then, upon identifying active driver assistance features and obtaining target selection parameters for the respective active features, the vehicle computer can perform target downselection for each of the target features. Target downselection, i.e., selecting target data sets for respective driver assist features, can include spatial filtering, state filtering, and sorting of targets to select a target set for each of the respective driver assist features.

In one or more implementations, a system may include a computer having a processor and a memory. The he memory may store instructions executable by the processor such that the computer is programmed to: identify respective driver assist features that are currently active in a vehicle; obtain parameters for determining respective sets of target objects for the driver assist features; apply the parameters of a first one of the driver assist features to output a first target set of one or more targets selected from a set of candidate objects for the first one of the driver assist features; and then apply the parameters of a second one of the driver assist features to output a second target set of one or more targets selected from the set of candidate objects for the second one of the driver assist features.

A further implementation may include instructions to apply the parameters of a third one of the driver assist features to output a third target set of one or more targets selected from the set of candidate objects for the first one of the driver assist features.

In an implementation, the parameters may include one or more of a spatial filter, a state filter, or a sorting filter.

In a further implementation, the parameters may include the spatial filter, wherein the spatial filter defines a region of interest for any one of the driver assist features.

In another implementation, the parameters may include the state filter, wherein the state filter defines an object type and a motion state for any one of the driver assist features.

In yet another implementation, the parameters may include the sorting filter, wherein the sorting filter defines at least a time-to-intersect or a distance for any one of the driver assist features.

In another implementation, the parameters may include one or more of (a) a first spatial filter for the first one of the driver assist features and a second spatial filter for the second one of the driver assist features, (b) a first state filter for the first one of the driver assist features and a second state filter for the second one of the driver assist features, or (c) a first sorting filter for the first one of the driver assist features and a second sorting filter for the second one of the driver assist features.

An implementation may further include instructions to operate the first one of the driver assist features based at least in part on the first target set.

Another implementation may further include a second computer having a second processor and a second memory, the second memory storing instructions executable by the second processor such that the second computer is programmed to receive the first target set and operate the first one of the driver assist features based at least in part on the first target set.

In a further implementation, the driver assist features may include at least one of controlling vehicle speed, steering, or a human machine interface.

One or more implementations of a method may include: identifying respective driver assist features that are currently active in a vehicle; obtaining parameters for determining respective sets of target objects for the driver assist features; applying the parameters of a first one of the driver assist features to output a first target set of one or more targets selected from a set of candidate objects for the first one of the driver assist features; and then applying the parameters of a second one of the driver assist features to output a second target set of one or more targets selected from the set of candidate objects for the second one of the driver assist features.

Another implementation may further include applying the parameters of a third one of the driver assist features to output a third target set of one or more targets selected from the set of candidate objects for the first one of the driver assist features.

In an implementation of the method, the parameters may include one or more of a spatial filter, a state filter, or a sorting filter.

In a further implementation of the method, the parameters may include the spatial filter, wherein the spatial filter defines a region of interest for any one of the driver assist features.

In another implementation of the method, the parameters may include the state filter, wherein the state filter defines an object type and a motion state for any one of the driver assist features.

In yet another implementation of the method, the parameters may include the sorting filter, wherein the sorting filter defines at least a time-to-intersect or a distance for any one of the driver assist features.

In another implementation of the method, the parameters may include one or more of (a) a first spatial filter for the first one of the driver assist features and a second spatial filter for the second one of the driver assist features, (b) a first state filter for the first one of the driver assist features and a second state filter for the second one of the driver assist features, or (c) a first sorting filter for the first one of the driver assist features and a second sorting filter for the second one of the driver assist features.

An implementation may further include operating the first one of the driver assist features based at least in part on the first target set.

Another implementation may further include transmitting the first target set, from a first computer via a vehicle network to a second computer that operates the first one of the driver assist features based at least in part on the first target set.

In an implementation of the method, the driver assist features may include at least one of controlling vehicle speed, steering, or a human machine interface.

With reference to FIG. 1, a vehicle system 100 can include a vehicle 102 having various components operating in an environment.

Vehicle 102 is a set of components or parts, including hardware components and typically also software and/or programming, to perform a function or set of operations in vehicle 102. Vehicle subsystems 106 typically include a braking system, a propulsion system, and a steering system as well as other subsystems including but not limited to a body control system, a climate control system, a lighting system, and a human-machine interface (HMI) system, which may include a heads-up display (HUD), an instrument panel, and infotainment system. The propulsion subsystem converts energy to rotation of vehicle 102 wheels to propel the vehicle 102 forward and/or backward. The braking subsystem can slow and/or stop vehicle 102 movement. The steering subsystem can control a yaw, e.g., turning left and right, maintaining a straight path, of the vehicle 102 as it moves.

Computers, including the herein-discussed one or more vehicle computers 104, (e.g., one or more electronic control units (ECUs), and central computer 120 include respective processors and memories. A computer memory can include one or more forms of computer readable media, and stores instructions executable by a processor for performing various operations, including as disclosed herein. For example, the computer can be a generic computer with a processor and memory as described above and/or an ECU, controller, or the like for a specific function or set of functions, and/or a dedicated electronic circuit including an ASIC that is manufactured for a particular operation, e.g., an ASIC for processing sensor data and/or communicating the sensor data.

In another example, computer may include an FPGA (Field-Programmable Gate Array) which is an integrated circuit manufactured to be configurable by a user. Typically, a hardware description language such as VHDL (Very High-Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in a computer.

A computer memory can be of any suitable type, e.g., EEPROM, EPROM, ROM, Flash, hard disk drives, solid state drives, servers, or any volatile or non-volatile media. The memory can store data, e.g., a memory of an ECU. The memory can be a separate device from the computer, and the computer can retrieve information stored in the memory, e.g., one or more computers 104 can obtain data to be stored via a vehicle network 112 in the vehicle 102, e.g., over an Ethernet bus, a CAN bus, a wireless network, etc. Alternatively, or additionally, the memory can be part of computer 104, i.e., as a memory of the computer 104 or firmware of a programmable chip.

The one or more vehicle computers 104 (e.g., one or more ECUs) can be included in a vehicle 102 that may be any suitable type of ground vehicle 102, e.g., a passenger or commercial automobile such as a sedan, a coupe, a truck, a sport utility, a crossover, a van, a minivan, etc. As part of a driver assist system or an advanced driver assist system (e.g., ADAS system), a vehicle computer 104 may include programming to operate one or more of vehicle 102 brakes, propulsion (e.g., control of acceleration in the vehicle 102 by controlling one or more of an internal combustion engine (ICE), electric motor, hybrid ICE/electric propulsion, etc. and control power delivery therefrom), steering, climate control, interior and/or exterior lights, etc., as well as to determine whether and when the computer, as opposed to a human operator, is to control such operations, such as by sending vehicle data over the vehicle network 112. Additionally, a vehicle computer 104 may be programmed to determine whether and when a human operator is to control such operations.

Vehicle computer 104 may include or be communicatively coupled to, e.g., via a vehicle network 112 such as a communications bus as described further below, more than one processor, e.g., included in sensors 108, electronic controller units (ECUs) or the like included in the vehicle 102 for monitoring and/or controlling various vehicle components, e.g., a powertrain controller, a brake controller, a steering controller, etc. The computer is generally arranged for communications on a vehicle 102 communication network that can include a bus in the vehicle 102 such as a controller area network (CAN) or the like, and/or other wired and/or wireless mechanisms. Alternatively, or additionally, in cases where the computer actually includes a plurality of devices, the vehicle network 112 may be used for communications between devices represented as the computer in this disclosure.

Vehicle network 112 is a network via which messages can be exchanged between various devices in vehicle 102. The vehicle computer 104 can be generally programmed to send and/or receive, via vehicle network 112, messages to and/or from other devices in vehicle 102 e.g., any or all of ECUs, sensors, cameras, actuators, components, communications module, a human machine interface HMI, etc. Additionally, or alternatively, messages can be exchanged among various such other devices in vehicle 102 via a vehicle network 112. In cases in which the vehicle computer 104 includes a plurality of devices, vehicle network 112 may be used for communications between devices represented as a computer in this disclosure. In some implementations, vehicle network 112 can be a network in which messages are conveyed via a vehicle 102 communications bus. For example, vehicle network 112 can include a controller area network (CAN) in which messages are conveyed via a CAN bus, or a local interconnect network (LIN) in which messages are conveyed via a LIN bus. In some implementations, vehicle network 112 can include a network in which messages are conveyed using other wired communication technologies and/or wireless communication technologies e.g., Ethernet, Wi-Fi, Bluetooth, Ultra-Wide Band (UWB), etc. Additional examples of protocols that may be used for communications over vehicle network 112 in some implementations include, without limitation, Media Oriented System Transport (MOST), Time-Triggered Protocol TTP, and FlexRay. In some implementations, vehicle network 112 can represent a combination of multiple networks, possibly of different types, that support communications among devices in vehicle 102. For example, vehicle network 112 can include a CAN in which some devices in vehicle 102 communicate via a CAN bus, and a wired or wireless local area network in which some device in vehicle 102 communicate according to Ethernet or WI-FI communication protocols.

Vehicle computer 104 can communicate via a wide area network (not shown), such as with servers, other vehicles, infrastructure elements, etc. Further, various computing devices discussed herein may communicate with each other directly, e.g., via direct radio frequency communications according to protocols such as Bluetooth or the like. For example, vehicle 102 can include a communication module 110 to provide communications with devices and/or networks not included as part of the vehicle 102, such as a Global Positioning Satellite (GPS, not shown) and the wide area network, for example. Communication module 110 can provide various communications, e.g., vehicle to vehicle (V2V), vehicle-to-infrastructure or everything (V2X) or vehicle-to-everything including cellular communications (C-V2X) wireless communications cellular, dedicated short range communications (DSRC), etc., to another vehicle or infrastructure typically via direct radio frequency communications and/or typically via the wide area network, and receive sensor data or augmented data from other sources. The communication module 110 could include one or more mechanisms by which a vehicle computer 104 may communicate, including any desired combination of wireless e.g., cellular, wireless, satellite, microwave and radio frequency communication mechanisms and any desired network topology or topologies when a plurality of communication mechanisms are utilized. Exemplary communications provided via the module can include cellular, Bluetooth, IEEE 802.11, DSRC, cellular V2X, CV2X, and the like.

A vehicle 102 in accordance with the present disclosure includes a plurality of sensors 108 that may support the driver assist, e.g., ADAS, features 107. For example, sensors 108 may include, but are not limited to, one or more wheel speed sensor, steering angle sensor, GPS sensor, forward-facing camera, side-facing camera, rear-facing camera, ultrasonic parking assist sensor, short range RADAR, medium range RADAR, LiDAR, accelerometer, inertial sensor, yaw rate sensor, etc.

Vehicle 102 includes driver assist features 107. In the context of this disclosure, a driver assist feature 107 means a vehicle system or subsystem that supports and/or controls and operation or function of the vehicle, e.g., speed control, steering control, output via a vehicle human machine interface, etc. A feature 107 may be implemented in and/or may include a vehicle computer 104 such as an ECU or the like. Example driver assist features 107 include a parking assist system, a lane keeping system, a lane centering system, a lane change system, a braking assist system, a rear cross-traffic assist system, a valet parking system, a cruise control system, a virtual bumper system, a backup assist system, etc. Furthermore, as used herein, driver assist features 107 include systems assisting a driver as well as autonomous driving systems that are based at least in part on sensed target objects. As will be understood, a driver assist feature 107 may be implemented with one or more ECUs in the vehicle 102 and include programming to receive sensor and/or target data, process the sensor and/or target data, and output a message and/or data over the vehicle network 112 to an ECU of a vehicle subsystem 106 to control an actuation the subsystem 106 (e.g., control steering, haptics, displays, braking, propulsion, etc.).

A vehicle 102 in accordance with the present disclosure also includes a downselection module 105 that may be used to perform target downselection for operations of a plurality of driver assist features 107 (i.e., "subscribers") in a generalized manner. The downselection module 105 is typically implemented in an ECU or the like, and as such may include hardware components (i.e., an ECU or processor and memory) and software and/or programming, to perform the operations discussed herein. The downselection module 105 is connected to the vehicle network 112 to receive data from sensors 108 and/or driver assist features 107, etc., and to provide or "publish" target data such as a target set 260 to the driver assist features 107 via the vehicle network 112. A target set 260 includes or identifies one or more target objects 240 to be tracked or monitored for a given driver assist feature 107.

Figure 2:
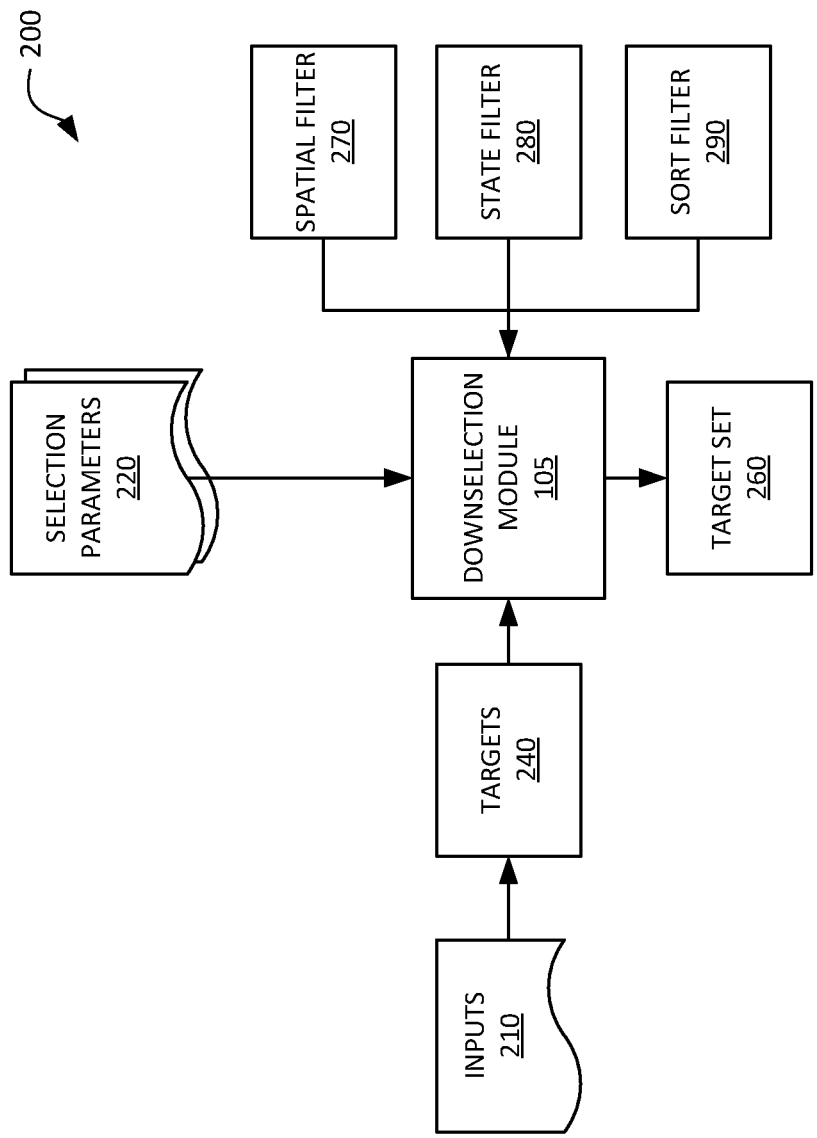
FIG. 2 is a block diagram of a generalized downselection module for a vehicle.

With reference to FIG. 2, an example schematic diagram of an exemplary target downselection system 200 for a vehicle 102 is illustrated.

An example target downselection system 200 according to the present disclosure, i.e., that provides downselection for multiple driver assist features 107, includes a downselection module 105 that receives targets 240 based on input data (or inputs) 210 and selection parameters 220. By applying the selection parameters 220 to the input data 210, the downselection module 105 outputs target sets 260 that can then be provided to a vehicle computer 104, e.g., an ECU or the like, that implements respective driver assist features 107, i.e., the downselection module 105 can output respective target sets 260 that each include or identify one or more targets 240 for a driver assist feature 107 that is one a plurality of driver assist features 107 currently active and a vehicle 102.

The selection parameters 220 for a driver assist feature 107 can specify one or more filters such as a spatial filter 270, a state filter 280, a sorting filter 290, and/or another suitable filter or filters. Selection parameters 220 can be specified or determined based on design considerations and/or empirical testing. For example, a selection parameter 220 specifying a range or distance from another vehicle for a given driver assist feature 107 could be determined based on empirical testing of that driver assist feature 107. For example, if the driver assist feature 107 were a cruise control feature, a range or distance could be specified based testing to determine appropriate ranges or distances of a target 240, e.g., another vehicle, at various speeds of any of vehicle 102. The determined ranges or distances at the various speeds could then be stored as selection parameters 220.

In the context of this disclosure, a "target" is an object identified in an environment around a vehicle and may also be referred to as a "target object." An object can be detected by data from one or more vehicle sensors 108 and/or could be identified from map data indicating a presence of an object (e.g., a road sign, a building, etc.) at a location. For example, presently existing object detection or object tracking systems that could be included in a vehicle 102 can use vehicle sensor data to output what are referred to as object "tracks," i.e., a set of data, sometimes referred to as "state" data, about an identified object typically including a type or class of the object (e.g., moving or not moving, car, bicycle, road sign, etc.), a location of the object at a specified time, a velocity of the object (i.e., a vector specifying a speed in a direction of travel), a confidence of an object detection or tracking system in the data for the object, etc. Further, an object or target 240 may be evaluated for a possibility of interacting with the host vehicle 102, and this may also be included in state data for an object. As will be understood, data from respective sensors 108 may be transmit or broadcast data on a vehicle network 112 at respective specified intervals or timesteps (e.g., at timesteps used on a CAN bus) and can be used by a vehicle computer 104, e.g., the downselection module 105, as inputs 210 to update the published downselected targets 240 over time based upon the most recent input data. Accordingly, targets 240 can include a variety of objects, such as another vehicle, a roadway sign, a traffic barrier, etc. and may be included in a list or set of data maintained, e.g., in a vehicle computer 104, according to a object location, object type, etc.

Table 1 below provides a nonlimiting example of data that can be provided for an object that is identified as a target 240, e.g., by a suitable tracking or object detection system that as presently known can be implemented in a vehicle 102 to output object data and data for tracking objects over time.

TABLE 1

| Input Datum | Explanation |
| --- | --- |
| positionX | X coordinate for the object in a coordinate system defined with respect to the host vehicle. |
| positionY | Y coordinate for the object in a coordinate system defined with respect to the host vehicle. |
| velocityX | Object velocity in the x direction. |
| velocityY | Object velocity in the y direction. |
| accelerationX | Object acceleration in the x direction. |
| accelerationY | Object acceleration in the y direction. |
| speed | Speed with respect to a ground surface. |
| heading | heading, typically specified with respect to global coordinates, e.g., as a deviation from north. |
| length | Object length |
| width | Object width. |
| Range | Distance of object from host vehicle, e.g., between a closest point on the object to a reference point on the vehicle, e.g., a geometric center of the vehicle or a surface of the vehicle. |
| probabilityExistence | A probability estimated by a tracking system that the described object exists, i.e., a confidence in the reported data. |
| type | Object type classification per a tracking and/or object recognition system, e.g., car, bus, motorcycle, pedestrian, sign, etc. |

Selection parameters 220 can be stored, e.g., in a memory, e.g., of a module 105, and can specify, for each of a plurality of driver assist features 107 that may need data about targets 240, criteria for target downselection for the respective driver assist feature 107. That is, respective parameters 220 can be defined for each of a plurality of driver assist features 107 to provide target data sets 260 for the respective driver assist features 107.

Selection parameters 220 for a specified driver assist feature 107 are a set of data values, i.e., criteria or thresholds, or evaluating values of inputs 210. For example, an adaptive cruise control driver assist feature 107 might include selection parameters 220 to select a target 240 for a target set 260 according to a position of the target 240 being within an arcuate region and/or along, or within a distance of, a longitudinal axis of the host vehicle 102 (e.g., a position), and within a range of the host vehicle 102. A lane-change assist feature 107 could further include selection parameters 220 to identify targets in a rectangular region or an adjacent lane to the host vehicle 102 in addition to forward and rear vehicles, along with velocities, headings, etc.

Figure 3:
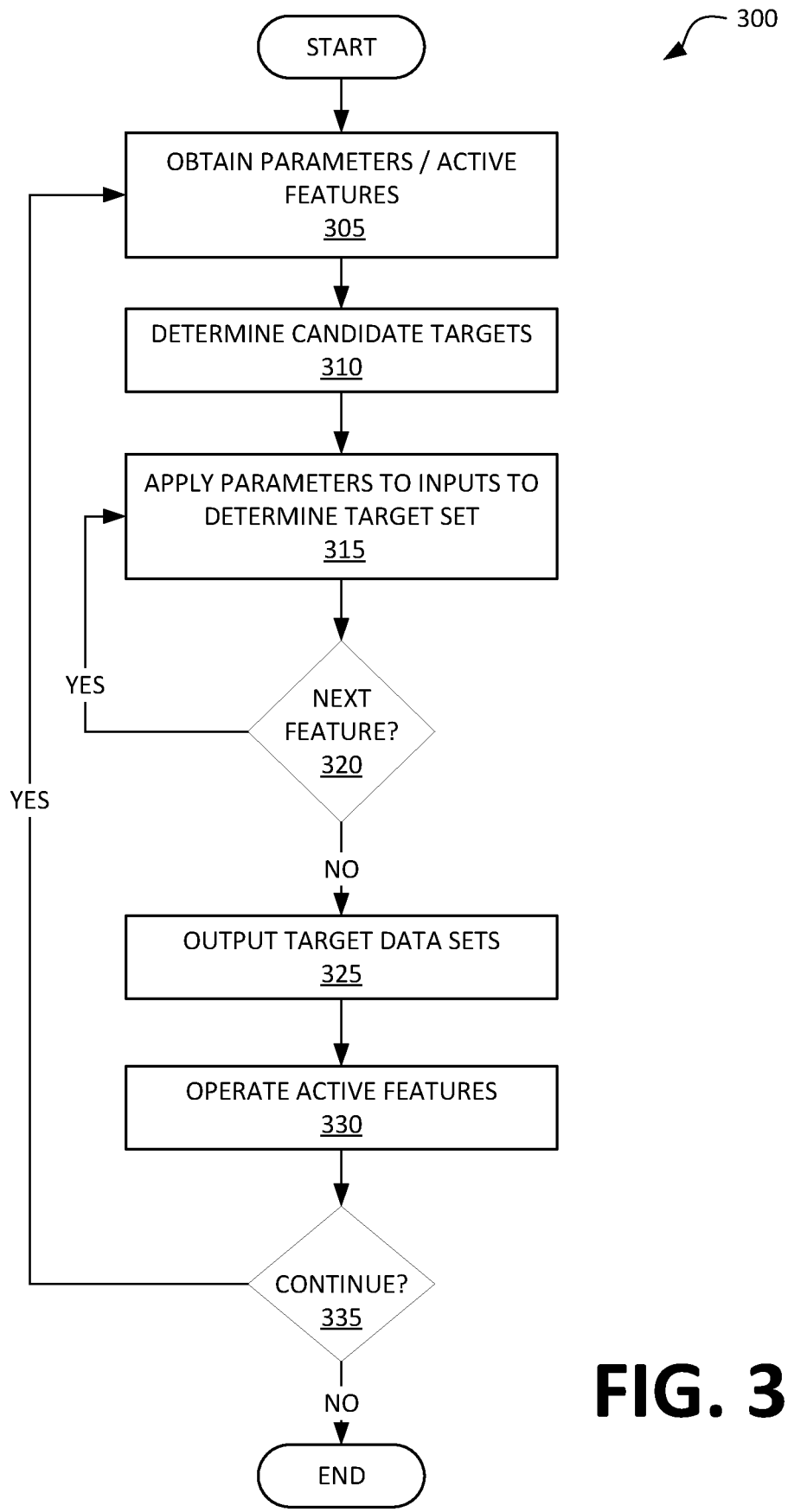
FIG. 3 is an example flow diagram of a target downselection from a downselection module.

Selection parameters 220 may be stored at, e.g., in a nonvolatile memory of, downselection module 105 that is accessed when a driver assist feature 107 receives target data transmitted from downselection module 105. FIG. 3, discussed below, illustrates an example process for applying selection parameters 220 to input data (inputs) 210 to select a target set 260 from possible targets 240.

Table 2, discussed further below with respect to FIG. 3, illustrates examples of selection parameters 220 for respective driver assist features 107 could be stored or maintained in a downselection module 105, e.g., in a memory of a computer 104. Typically, a set of selection parameters 220 for a driver assist feature 107 is a record or set of data fields of data that includes:

An identifier for the driver assist feature 107 (e.g., lane keeping, lane centering, adaptive control, etc.);

An identifier for one or more respective filters such as filters 270, 280, 290 to identify targets 240 for inclusion for the feature 107 in a target set 260;

Criteria or thresholds for applying each of the identified filters, i.e., the criteria or thresholds specifying values for various input data 210 according to which a target 240 will pass or fail the filter, i.e., be included or not included in a target set 260; and A number of desired or required targets to pass the filters for the identified feature 107 to be used, e.g., for use by a sort filter 290 described further below.

It should be noted that a selection parameter 220 can be dependent on another parameter in a set of parameters 220 for a feature 107. For example, a distance or range parameter 220 could be dependent on one or more inputs 210 in addition to an input 210 to which the range parameter 220 is compared. In one such example, a range parameter for a forward target 240 in an adaptive cruise control feature 107 may be dependent on a speed input 210 of the target 240, e.g., a range parameter may be less or smaller for lower target 240 speeds, and higher or greater at greater or higher target 240 speeds. Thus, an input 210 providing the target 240 range would be compared to a range parameter 220 that was determined at least in part based on the target 240 speed.

In some implementations, for an identified feature 107, different sets of filters could be identified for different subsets of targets 240 to be downselected for the feature 107. To take just one example, an adaptive cruise control feature could require identification of a first number of targets forward of an ego vehicle 102 and a second number of targets to the rear of the ego vehicle 102. The selection parameters for that feature 107 could thus include both the first number and the second number of respective subsets of targets 240 to comprise a target set 260 downselected for the feature 107, as well as respective sets of first and second filters for identifying the targets 240 respectively in the first and second subsets of targets 240 comprising the target set 260 for that feature 107.

A spatial filter 270 can be defined for an area of interest for a given driver assist feature 107. The spatial filter 270 can thus identify targets 240 of interest for the driver assist feature 107, i.e., targets within the region, i.e., area or space, of interest, and can exclude targets 240 that do not fall within the defined region. That is, only targets 240 within the defined region will be included in the target set 260 for a driver assist feature 107. For example, spatial filtering criteria data may include data to define a region proximate to the vehicle 102 where targets of interest are located, such as defined rectangular regions, circular regions, arcuate regions, polygons, and/or combinations thereof. Regions may be defined in a coordinate system defined with reference or relative to a host vehicle. The coordinate system may be two-dimensional (2D) since both 2D and three-dimensional (3D) target data may be filtered based upon 2D region or location specifications.

A state filter 280 removes targets based on a state of a target 240. A "state" of an object in the present context means one or more current physical attributes of the object. For example, a state of an object can specify whether the object is moving or non-moving (or static or dynamic), its dimensions (length and width), its range (distance) from the host, range changes (oncoming, receding), and/or can classify the object according to an object type, i.e., a category of object such as passenger vehicle, motorcycle, bicycle, road sign, etc. A state filter can be used by the downselection module 105 to select target objects for tracking based on a current driver assist feature 107 using target tracking. For example, a cruise control operation may track dynamic vehicles, an emergency braking operation may track all objects (static and dynamic), a virtual bumper operation may track static objects, a lane-keeping operation may track lane lines, etc.

A sort filter 290 can be applied, typically after the spatial filter 270 and state filter 280 are applied, to identify targets 240 that are deemed most relevant to a driver assist feature 107 based upon one or more specified criteria. In examples, a sort filter 290 can sort targets 240 according to a range from the host vehicle 102, a heading, a velocity, etc., where the filter 290 selects a specified top number, e.g., three or four, targets 240 that are closest to a specified selection parameter 220, e.g., a range parameter 220, a velocity parameter 220, etc.

Upon downselection of targets 240 from input data 210 at a timestep, downselection module 105 may provide or publish downselected target data, i.e., a target set 260 including various data as described above, to one or more features 107 based on the selection parameters 220.

FIG. 3 illustrates an example flow diagram of a process 300 for a downselection module 105 to provide target downselection of a plurality of targets for a plurality of driver assist features 107. The process 300 is further described with respect to Examples A and B, which provide example illustrations of carrying out the process 300. Example A illustrates target 240 downselection for an adaptive cruise control feature 107. Example B illustrates target 240 downselection for parking assist feature 107.

The process 300 may begin upon one or more conditions being met, such as a vehicle 102 being powered on, one or more driver assist features 107 being activated, etc.

In a first block 305, the downselection module 105 obtains selection parameters 220. For example, the downselection module 105 may determine, e.g., from data available on the vehicle network 112, a set of active driver assist features 107. The downselection module 105 may then retrieve, e.g., from a nonvolatile memory, respective selection parameters 220 for the active driver assist features 107. For Examples A and B, respectively, parameters 220 could be as follows:

TABLE 2

| Example A | Example B |
| --- | --- |
| Active feature 107: cruise control | Active feature 107: parking assist |
| Target number: 4 objects | Target number: 2 objects |
| Spatial parameter: arcuate region, front | Spatial parameter: rectangle, right side |
| State parameter: dynamic, vehicles, 0.7 prob. | State parameter: static, any object, 0.7 prob. |
| Sort parameter - time-to-intersect (shortest) | Sort parameter - range (closest) |

Next, in a block 310, the downselection module 105 determines identified targets 240, which may be referred to as candidate targets 240, from inputs 210, e.g., data from vehicle sensors 108 and/or a suitable object tracking system such as mentioned above, available on the vehicle network 112, that may describe targets 240. In the present examples, assume that 264 targets 240 are initially identified.

Next, in a block 315, the downselection module 105 applies the selection parameters obtained in the block 305 to the targets 240 identified in the block 310, i.e., by evaluating, e.g., comparing, inputs 210 for the targets 240 with respect to the selection parameters 220, as described above. A target set 260 can thus be identified, as explained above, i.e., the targets set 260 includes a set of targets 240 that satisfy the selection parameters 220 for active driver assist features 107, and that can be provided to more than one of the driver assist features 107.

Figure 4A:
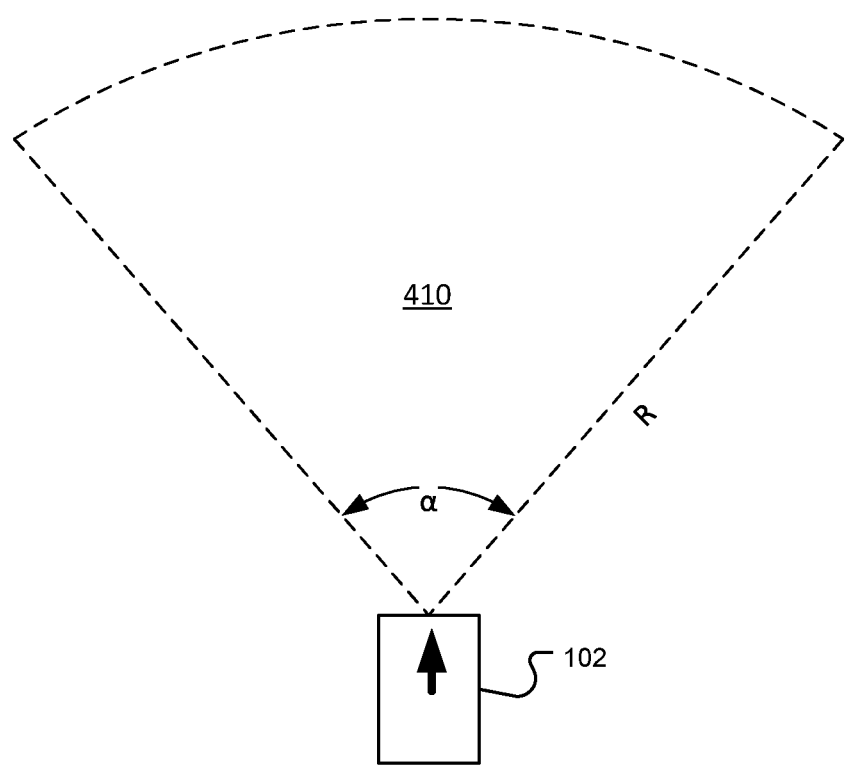
FIG. 4A is an example diagram of an arcuate region spatial specification.

In present Example A, spatial filtering based on an arcuate region forward of the host vehicle 102, such as illustrated generally by arcuate region 410 in FIG. 4A, e.g., having a radius of 80 m (meters) and being 45° with an origin at a front center of the host vehicle 102, reduces the 264 initial targets 240 to a set of 22 targets 240. Then applying a state filter in Example A limiting downselected targets 240 to objects of a dynamic (moving) "vehicle" type with a probability of detection greater than 70% reduces the set of 22 targets output from the spatial filter to a set of 9 targets 240. Further, applying a sort filter 290 that selects the four targets 240 with the lowest times to intersect with the host vehicle 102 results in four targets 240 for the downselected target data set 260.

Figure 5A:
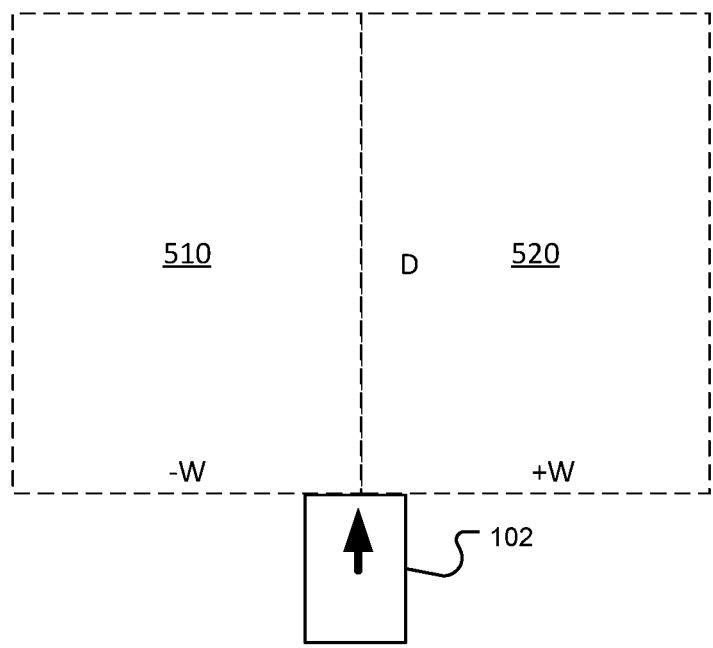
FIG. 5A is an example diagram of a rectangular region spatial specification.
Figure 5B:
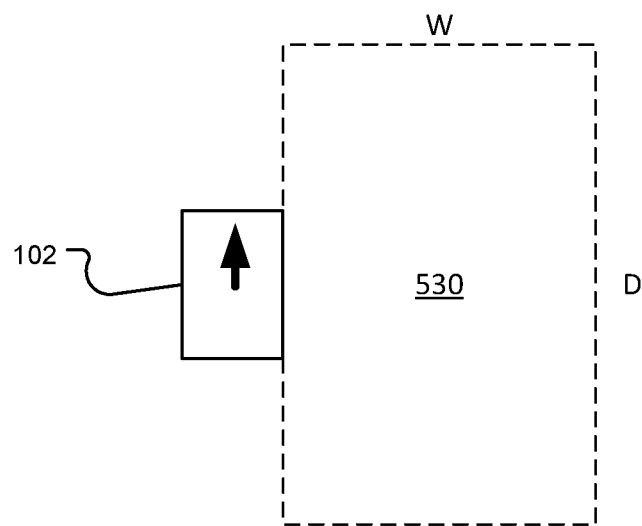
FIG. 5B is an example diagram of another rectangular region spatial specification.

In Example B, spatial filtering for a rectangular region defined by a length of the vehicle 102 wheelbase and having a width of 30 m to a side of the host vehicle 102, such as illustrated generally by rectangular region 530 in FIG. 5B, reduces the 264 initial targets 240 to a set of 27 targets 240. Then, applying a state filter 280 in Example B for static (nonmoving) targets with any object type classification with a probability of accurate detection of 70% or higher, reduces the set of 27 targets output from the spatial filter 270 to 9 targets 240. Further, applying a sort filter 290 that selects the two targets 240 with a lowest (or closest) range to the host vehicle 102 results in two targets 240 for the downselected target data set 260.

Next, in a decision block 320, the computer 104 determines whether further features 107 remain to be processed.

In the present example, Example A could represent processing a first feature 107, and then in the block 320, after processing Example A, the computer 104 could determine that a second feature 107 remained to be processed, whereupon processing would proceed as described above for Example B. If further features remain to be processed, then the process 300 returns to the block 315. Otherwise, the process 300 proceeds to a block 325.

In a block 325, target data sets 260 are output via a vehicle network 112 and/or by the computer 104 for use by a feature 107 implemented in that computer 104, or the respective features 107 identified in the block 305. For example, a first target data set 260 could be output identifying targets 240 for a first feature 107 as in Example A, and a second target data set 260 could be output identifying targets 240 for a second feature 107 as in Example B. It is to be understood that in many instances of the process 300, more than two features 107 can be processed.

Next, in a block 330, the active driver assist features 107 are operated, e.g., according to programming implemented in one or more vehicle computers 104, according to the respective targets 240 in the targets set 260 determined in the block 315.

Following the block 330, in a decision block 335, the downselection module 105 determines whether the process 300 is to continue. For example, a vehicle 102 could be powered off, placed in a "park" mode, or in some other state to trigger discontinuing the process 300. If the process 300 is to continue, then the process 300 returns to the block 305 to retrieve or update parameters 220. Otherwise, the process 300 ends following the block 325.

FIG. 4A illustrates an example diagram of an arcuate region 410 used for spatial filtering relative to vehicle 102. An arcuate region means a portion of a circular region defined by a radius fixed at a proximate end moving through an arc at a distal end. The arcuate region 410 may be defined in this example by an origin at a front center of vehicle 102, a radius R, and a sweep angle α. Other origins, radii, directions, and angles may be used without departing from the scope of the present disclosure, and multiple arcuate or other shaped regions may be combined to define a base region for spatial filtering for downselection of targets.

Figure 4B:
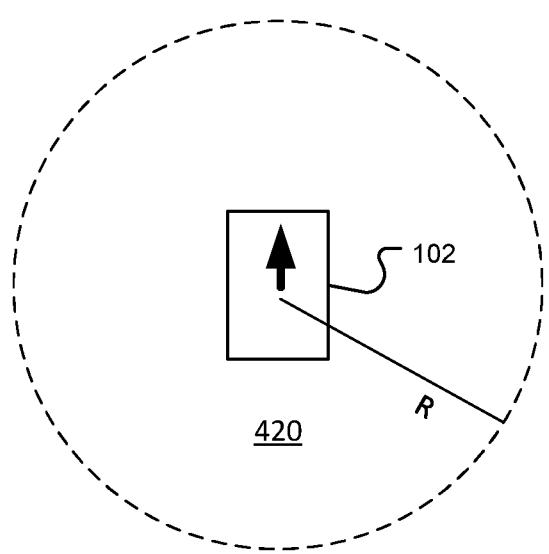
FIG. 4B is an example diagram of a circular region spatial specification.

FIG. 4B illustrates an example diagram of a circular region 420 used for spatial filtering relative to vehicle 102. The circular region 420 may be defined by an origin at a center of vehicle 102 and a radius R. For example, in an implementation of the parking assist feature 107 of Example B in FIG. 3, the spatial filter may use a circular region 420 to downselect targets 240 on all sides of the vehicle rather than just the right side. Other origins and radii may be used without departing from the scope of the present disclosure, and multiple circular or other shaped regions may be combined to define a base region for spatial filtering for downselection of targets.

FIG. 5A illustrates an example diagram of rectangular regions 510 and 520 used for spatial filtering relative to vehicle 102. The first rectangular region 510 may be defined by an origin at a center of vehicle 102, a width of −W and a depth of D. A second rectangular region 520 may be defined by an origin at a center of vehicle 102, a width of +W and a depth of D. For example, in an implementation of the cruise control feature 107 of Example A in FIG. 3, the spatial filter may use rectangular regions 510 and 520 to downselect targets 240 in a 2W×D region in front of the vehicle rather than just the arcuate region. Other origins, widths, depths, etc. may be used without departing from the scope of the present disclosure, and multiple rectangular or other shaped regions may be combined to define a base region for spatial filtering for downselection of targets.

FIG. 5B illustrates an example diagram of a rectangular region 530 used for spatial filtering relative to vehicle 102. The rectangular region 530 may be defined by an origin disposed on a line parallel to a right-side vehicle 102 and located −0.5*D behind a longitudinal center of vehicle 102, a width of +W, and a depth of +D. Other origins, depths, widths, etc. may be used without departing from the scope of the present disclosure, and multiple rectangular or other shaped regions may be combined to define a base region for spatial filtering for downselection of targets.

Base region shapes used for spatial filtering are not limited to these examples, and may use any other suitable shape (triangle, trapezoid, ellipse, lane, etc.) or combinations thereof that may be desired and described in selection parameters 220 for use by a downselection process.

While disclosed above with respect to certain implementations, various other implementations are possible without departing from the current disclosure.

Use of in response to, based on, and upon determining herein indicates a causal relationship, not merely a temporal relationship. Further, all terms used in the claims are intended to be given their plain and ordinary meanings as understood by those skilled in the art unless an explicit indication to the contrary is made herein. Use of the singular articles "a," "the," etc., or a specification or statement of "one" element, should be read to recite one or more of the indicated elements unless a claim recites an explicit limitation to the contrary.

In the drawings, the same or like reference numbers indicate the same or like elements. Further, some or all of these elements could be changed. With regard to the media, processes, systems, methods, etc. described herein, it should be understood that, although the steps of such processes, etc. have been described as occurring according to a certain ordered sequence, unless indicated otherwise or clear from context, such processes could be practiced with the described steps performed in an order other than the order described herein. Likewise, it further should be understood that certain steps could be performed simultaneously, that other steps could be added, or that certain steps described herein could be omitted. In other words, the descriptions of processes herein are provided for the purpose of illustrating certain implementations and should in no way be construed so as to limit the present disclosure.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A system comprising a computer including a processor and a memory, the memory storing instructions executable by the processor such that the computer is programmed to:
   identify respective driver assist features that are currently active in a vehicle;
   obtain parameters specifying one or more filters for determining respective sets of target objects for the driver assist features from input data;
   apply the parameters of a first one of the driver assist features to the input data to output a first target set of one or more targets selected from a set of candidate objects for the first one of the driver assist features;

then apply the parameters of a second one of the driver assist features to the input data to output a second target set of one or more targets selected from the set of candidate objects for the second one of the driver assist features;

operate the vehicle according to the first one of the driver assist features by actuating a component of the vehicle based on the first target set of one or more targets; and operate the vehicle according to the second one of the driver assist features by actuating the component of the vehicle or another component of the vehicle based on the second target set of one or more targets.

2. The system of claim 1, further comprising instructions to:

apply the parameters of a third one of the driver assist features to output a third target set of one or more targets selected from the set of candidate objects for the first one of the driver assist features.

3. The system of claim 1, wherein the filters include one or more of a spatial filter, a state filter, or a sorting filter.

4. The system of claim 3, wherein the filters include the spatial filter, wherein the spatial filter defines a region of interest for any one of the driver assist features.

5. The system of claim 3, wherein the filters include the state filter, wherein the state filter defines an object type and a motion state for any one of the driver assist features.

6. The system of claim 3, wherein the filters include the sorting filter, wherein the sorting filter defines at least a time-to-intersect or a distance for any one of the driver assist features.

7. The system of claim 3, wherein the filters include one or more of (a) a first spatial filter for the first one of the driver assist features and a second spatial filter for the second one of the driver assist features, (b) a first state filter for the first one of the driver assist features and a second state filter for the second one of the driver assist features, or (c) a first sorting filter for the first one of the driver assist features and a second sorting filter for the second one of the driver assist features.

8. The system of claim 1, further comprising instructions to operate the first one of the driver assist features based at least in part on the first target set.

9. The system of claim 1, further comprising a second computer including a second processor and a second memory, the second memory storing instructions executable by the second processor such that the second computer is programmed to receive the first target set and operate the first one of the driver assist features based at least in part on the first target set.

10. The system of claim 1, wherein the driver assist features include at least one of controlling vehicle speed, steering, or a human machine interface.

11. A method, comprising:

identifying respective driver assist features that are currently active in a vehicle;

obtaining parameters specifying one or more filters for determining respective sets of target objects for the driver assist features from input data;

applying parameters of a first one of the driver assist features to the input data to output a first target set of one or more targets selected from a set of candidate objects for the first one of the driver assist features;

then applying the parameters of a second one of the driver assist features to output a second target set of one or more targets selected from the set of candidate objects for the second one of the driver assist features;

operating the vehicle according to the first one of the driver assist features by actuating a component of the vehicle based on the first target set of one or more targets; and operating the vehicle according to the second one of the driver assist features by actuating the component of the vehicle or another component of the vehicle based on the second target set of one or more targets.

12. The method of claim 11, further comprising applying the parameters of a third one of the driver assist features to output a third target set of one or more targets selected from the set of candidate objects for the first one of the driver assist features.

13. The method of claim 11, wherein the filters include one or more of a spatial filter, a state filter, or a sorting filter.

14. The method of claim 13, wherein the filters include the spatial filter, wherein the spatial filter defines a region of interest for any one of the driver assist features.

15. The method of claim 13, wherein the filters include the state filter, wherein the state filter defines an object type and a motion state for any one of the driver assist features.

16. The method of claim 13, wherein the filters include the sorting filter, wherein the sorting filter defines at least a time-to-intersect or a distance for any one of the driver assist features.

17. The method of claim 13, wherein the filters include one or more of (a) a first spatial filter for the first one of the driver assist features and a second spatial filter for the second one of the driver assist features, (b) a first state filter for the first one of the driver assist features and a second state filter for the second one of the driver assist features, or (c) a first sorting filter for the first one of the driver assist features and a second sorting filter for the second one of the driver assist features.

18. The method of claim 11, further comprising operating the first one of the driver assist features based at least in part on the first target set.

19. The method of claim 11, further comprising transmitting the first target set, from a first computer via a vehicle network to a second computer that operates the first one of the driver assist features based at least in part on the first target set.

20. The method of claim 11, wherein the driver assist features include at least one of controlling vehicle speed, steering, or a human machine interface.

* * * * *